United States Patent [19]
Majima et al.

[11] Patent Number: 5,592,318
[45] Date of Patent: Jan. 7, 1997

[54] LIQUID CRYSTAL DISPLAY APPARATUS HAVING AN INORGANIC FILLER BETWEEN PIXEL ELECTRODES AND A METHOD FOR PRODUCING THE SAME

[75] Inventors: Kenji Majima, Matsubara; Yoshitaka Yamamoto, Yamatokoriyama, both of Japan

[73] Assignee: Sharp Kabushiki Kaisha, Japan

[21] Appl. No.: 255,709

[22] Filed: Jun. 7, 1994

[30] Foreign Application Priority Data

Jun. 7, 1993 [JP] Japan .................. 5-136228

[51] Int. Cl.⁶ .............. G02F 1/1333; G02F 1/1343
[52] U.S. Cl. .............................. 349/122; 349/139
[58] Field of Search .................. 359/74, 87, 89

[56] References Cited

U.S. PATENT DOCUMENTS

| | | | |
|---|---|---|---|
| 4,408,837 | 10/1983 | Kozaki et al. | 359/74 |
| 4,602,850 | 7/1986 | DeBenedetti | 350/333 |
| 5,042,918 | 8/1991 | Suzuki | 359/87 |
| 5,056,895 | 10/1991 | Kahn | 359/74 |
| 5,426,526 | 1/1995 | Yamamoto et al. | 359/82 |
| 5,436,635 | 7/1995 | Takahara et al. | 345/92 |

FOREIGN PATENT DOCUMENTS

| | | |
|---|---|---|
| 294899 | 12/1988 | European Pat. Off. . |
| 509727 | 10/1992 | European Pat. Off. . |
| 53-72647 | 6/1978 | Japan . |
| 56-83781 | 7/1981 | Japan . |
| 57-13426 | 1/1982 | Japan ............ 359/74 |
| 57-122479 | 7/1982 | Japan . |
| 2-27318 | 1/1990 | Japan ............ 359/87 |
| 2-148021 | 6/1990 | Japan ............ 359/74 |
| 593922 | 4/1993 | Japan . |

*Primary Examiner*—William L. Sikes
*Assistant Examiner*—Charles Miller

[57] ABSTRACT

A liquid crystal display apparatus includes: a first substrate having a silicon layer on the surface thereof; a transparent second substrate placed so as to face the silicon layer; and a liquid crystal layer sandwiched between the first substrate and the second substrate, wherein the first substrate includes a plurality of switching elements formed in the silicon layer, a protection layer formed on the surface of the first substrate so as to cover the switching elements, a plurality of pixel electrodes with gaps therebetween formed in a matrix on the protection layer, and a filler for filling the gaps, wherein the surface of the filler is formed so as to be at the same level as that of the surfaces of the pixel electrodes.

7 Claims, 9 Drawing Sheets

LIQUID CRYSTAL DISPLAY APPARATUS HAVING AN INORGANIC FILLER BETWEEN PIXEL ELECTRODES AND A METHOD FOR PRODUCING THE SAME

BACKGROUND OF THE INVENTION

1. Field of the Invention

The present invention relates to a liquid crystal display apparatus and a method for producing the same.

2. Description of the Related Art

The liquid crystal display apparatus has been put into practical use in a wide range of applications from hand-held calculators to portable television. In Particularly, an active matrix type display apparatus in which each pixel of a display section has a switching element is often used when a clear image display is required.

In the active matrix type display apparatus, a thin film transistor (hereinafter referred to as "TFT") using a thin film of amorphous silicon, polysilicon or the like is used as the switching element. The characteristics of the TFT depend on the materials of a thin film constituting the TFT. The materials of the thin film of the TFT can be broadly classified into three types as follows:

(1) amorphous silicon (2) low-temperature polysilicon (3) high-temperature polysilicon Hereinafter, thin films using the above silicons are described, respectively.

(1) Since an amorphous silicon thin film can be formed at a low temperature of around 350° C., common inexpensive glass such as Corning 7059 (manufactured by Corning Co., Ltd.) can be used as a substrate on which the thin film is formed. The use of the amorphous silicon thin film makes it possible to realize a relatively large liquid crystal display apparatus having a diagonal length of 15 inches. Such a liquid crystal display apparatus is now the main type used in active matrix type liquid crystal display apparatus. However, common inexpensive glass cannot be processed at a temperature equal to or higher than 600° C. Therefore, a thermal oxide film that is excellent in electrical insulation where pin holes are not likely to occur cannot be obtained on the substrate formed of the common inexpensive glass. Moreover, there exists a number of capture levels in the thin film made of the amorphous silicon, and the field effect mobility $\mu e$ (electron mobility) is approximately 0.1 to 0.5 $cm^2V^{-1}S^{-1}$. Therefore, since the TFT using the amorphous silicon thin film has a relatively high ON-resistance, a circuit, such as a driver circuit, including fine transistors having an excellent performance cannot be fabricated on the same substrate on which the display section is formed. Thus, a driver IC should be mounted on the substrate using a film carrier or the like.

However, this mounting of the driver IC raises a new problem. In the case of a projection-type LCD having a size of approximately 2 inches, the pitch of pixels of the display section is 21 μm vertically and 23 μm horizontally. In the case of a color display by a color filter, the pitch is reduced to 21 μm vertically and 8 μm horizontally. At present, it is impossible to connect the driver IC to each line for the pixels with the fine pitch, and as a result, the driver IC cannot be applicable to a projection-type LCD.

(2) A low-temperature polysilicon is formed by the crystallization of silicon by means of an annealing process or a laser annealing process conducted over a long period of time. Heat resisting glass is used for the substrate on which a thin film of the low-temperature polysilicon is formed. In this case, the maximum processing temperature is in the range of 550° to 600° C. In the case of the low-temperature polysilicon, a field effect mobility $\mu e$ is approximately 50 $cm^2V^{-1}S^{-1}$ and $\mu h$ (hole mobility) is approximately 15 $cm^2V^{-1}S^{-1}$. Thus, in general, the low-temperature polysilicon TFT has better transistor characteristics than the amorphous silicon TFT.

(3) A high-temperature polysilicon is formed utilizing a quartz substrate excellent in heat resistance. Since the quartz substrate can be processed at a high temperature of approximately 1000° C., the fabricating process of the IC can be adopted to the fabrication of the high-temperature polysilicon TFT. Among the three methods mentioned above, this method makes it possible to form the TFT having the best characteristics. A field effect mobility $\mu e$ of the high-temperature polysilicon is approximately 100 $cm^2V^{-1}S^{-1}$.

As described above, since a better transistor can be obtained with the polysilicon than with the amorphous silicon the polysilicon is advantageous in that the TFT and part of the driving circuit can be integrally formed on the glass substrate.

However, the TFT formed of the low-temperature polysilicon has a problem of a low operating speed. For example, in the case where a CMOS shift resister is formed using the low-temperature polysilicon TFT, the maximum operating frequency is measured to be no more than approximately 5 MHz.

The field effect mobility e of the high-temperature polysilicon is relatively high as compared with those of the amorphous silicon and the low-temperature polysilicon. Therefore, the TFT formed of the high-temperature polysilicon is excellent in characteristics with the maximum operating frequency of approximately 15 MHz.

The development of an HDTV (High Definition TV) with high precision is urgently required as the next generation visual medium.

A display for an HDTV has 1125 scanning lines, 1875 data lines, and about 2,100,000 pixels corresponding to these lines. In the case of a color display, the number of the pixels is tripled, i.e. about 6,300,000 pixels.

In the case of a non-interlace driving, the field frequency is 60 Hz, the driving time for each scanning line is about 15 microseconds, and the frequency of the each scanning line is 67.5 KHz. The driving time for each data line is about 0.008 microseconds without a color filter, and the frequency of each data line is about 130 MHz. In the case of a color display, the frequency is 390 MHz.

In the case of an interlace driving, the field frequency is 60 Hz, the number of scanning lines is 560, and the driving frequency of each scanning line is 33.75 KHz. The driving frequency of each data line is about 63 MHz without a color filer. In the case of a color display, the frequency is 190 MHz.

The above driving frequency cannot be obtained with the operating speed of the polysilicon TFT described above. In order to obtain a driving frequency necessary for the HDTV, data processing such as a time-scale expansion is required, resulting in a complicated peripheral circuit system.

Moreover, since the leak current is large in the polysilicon TFT, it is impossible to make the ratio of an ON current to an OFF current(ON/OFF current ratio) large. The ON/OFF current ratio of the polysilicon TFT is approximately $10^7$. In order to be applicable to the HDTV, the ON/OFF current ratio should be about $10^8$. For improving the ON/OFF current ratio, it is necessary to make the TFT larger in size or to connect the TFTs in series. However, with such a modification, there arises a new problem in that an LCD cannot be miniaturized.

As a method for solving such a problem, the method of mounting the TFTs on a single-crystalline silicon substrate has been disclosed. The transistor characteristics in the case where the TFTs are formed on the single-crystalline silicon are as follows:

Mobility: 1500 cm$^2$V$^{-1}$S$^{-1}$

ON/OFF current ratio of the transistor: 10$^9$ or more

Maximum operating frequency of the transistor: several GHz

As seen from the above description, if a single-crystalline silicon is used as the substrate of the display apparatus and the method of forming the transistors on the single-crystalline silicon is employed, the operating speed of the transistors required for the display apparatus for the HDTV can be realized.

FIG. 5 shows an example of a liquid crystal display apparatus in which switching transistors are formed on the substrate made of single-crystalline silicon. As shown in FIG. 5, a field silicon oxide film 56 is formed on an entire surface of a base substrate 57 made of single-crystalline silicon. The field silicon oxide film 56 has opening areas for defining active regions of the transistors. A source region 58 and a drain region 59 of each transistors are formed in the corresponding active region of the base substrate 57. Each MOS transistor has a gate insulating film 61 and a gate electrode 60. The source region 58 and the drain region 59 are in contact with aluminum electrodes 54a and 54b formed on the field silicon oxide film 56, respectively.

The switching transistors are covered with a protective film 55 formed on an entire surface of the base substrate 57. The protective film 55 has a through hole 55b in each unit pixel region, reaching the aluminum electrode 54b. On the surface of the protection film 55, a plurality of pixel electrodes (also used as reflectors) 54 divided by a gap 55a are formed in a matrix so as to cover substantially the entire surface of the base substrate 57. The pixel electrode 54 is connected with the aluminum electrode 54b via the through hole 55b. The pixel electrode 54 is made of aluminum.

A transparent counter electrode 52 is formed on the entire counter surface of the glass substrate 51 disposed so as to face the base substrate 57. An alignment film (not shown in FIG. 5) is formed so as to cover the counter electrode 52.

Since the single-crystalline silicon is opaque, it is used as a substrate for a reflection-type display apparatus. Therefore, a problem which does not occur in a transmission-type display apparatus arises.

The reflection-type liquid crystal display apparatus used for a projection-type display system requires the following conditions:

(1) In the reflection-type liquid crystal display apparatus, reflectors (also used as pixel electrodes) are formed on one of the substrates. Surfaces of the reflectors should be mirror finished.

(2) The reflectors should be separately provided for each pixel. In order to make the alignment of the liquid crystal molecular uniform, the surface of a through hole provided between the reflectors should be flush with the surfaces of the reflectors.

In order to meet the above requirements, Japanese Laid-Open Patent Publication No. 56-83781 discloses an invention as described below. FIG. 6 shows a sectional view of a liquid crystal display apparatus according to the disclosed invention.

In the disclosed display, the surface of a substrate is coated with polyimide 18 so as to be planarized. After a through hole 19 is made at a required portion, it is filled with metal 20, so that surfaces of the pixel electrodes 21 can be planarized. However, the surfaces of the pixel electrodes 21 are not mirror finished in this method, therefore the disclosed display apparatus is insufficient as a projection-type liquid crystal display device.

Japanese Laid-Open Patent Publication No. 53-72647 discloses three methods as described below. FIG. 7 shows a sectional view of a substrate of a liquid crystal display apparatus according to the disclosed invention.

(1) A method including the steps of: forming a planarization film 71 on an entire surface of the substrate 70; forming a contact hole to one of the electrodes of a transistor previously formed on the substrate 70; and forming a reflector 74 on the entire surface of the substrate 70 by vapor-deposition.

(2) A method including the steps of: forming the planarization film 71 on an entire surface of the substrate 70; forming a contact hole to one of the electrodes of a transistor previously formed on the substrate 70; filling a through hole 72 with metal 73; and forming the pixel electrode 74 by vapor-deposition.

(3) A method including the steps of: coating the surface of the substrate 70 with a photoresist; forming a contact hole to one of the electrodes of a transistor previously formed on the substrate 70; filling a through hole 72 with metal 73; removing the photoresist; coating the substrate 70 with the planarization film 71; polishing the entire surface of the planarization film 71; and forming the reflector 74.

In any of the methods described above, after the formation of the metal layer as a pixel electrode, mirror finishing is not performed on the surface of the metal layer. Therefore, the minute unevenness (hillocks) on the metal layer produces scattering of light. Thus, the resultant display apparatus is insufficient as a projection-type liquid crystal display apparatus.

Moreover, since the smoothing process of the surfaces of the fillers for filling gaps separating the pixels and the surfaces of the pixel electrodes is not performed, incomplete alignment of the liquid crystal molecular occurs.

The methods described above were originally directed to the application of a direct-view type display in which the requirements of smoothing the surface of the substrate and mirror finishing the pixel electrodes were not as strict as those of the projection type display.

FIG. 8 shows a sectional view of a substrate of a liquid crystal display apparatus disclosed in Japanese Laid-Open Patent Publication No. 57-122479. In this display apparatus, polycrystalline silicon 22 is formed on a driving transistor section formed on the substrate. Then, after planarizing an entire surface of the polycrystalline silicon 22, pixel electrodes 30 are formed thereon. Therefore, the surface of the polycrystalline silicon 22 is planarized. However, since mirror finishing is not performed on the surface of the pixel electrode 30 made of metal formed on the polycrystalline silicon 22, scattering of light due to the hillocks of metal occurs. Thus, the resultant display apparatus is insufficient as a projection-type liquid crystal display apparatus. Since the smoothing process of the surfaces of the fillers 29 for filling gaps 27 separating the pixel electrodes 30 and the surfaces of the pixel electrodes 30 is not performed, incomplete alignment of the liquid crystal molecular occurs.

The objectives of the present invention are to provide a projection-type liquid crystal display apparatus having a substrate of which the reflecting face is smoother than a conventional one and a method for producing the same, thereby contributing to the realization of a projection-type liquid crystal display apparatus applicable for the HDTV.

SUMMARY OF THE INVENTION

A liquid crystal display apparatus according to the present invention includes: a first substrate having a silicon layer on a surface thereof; a transparent second substrate placed so as to face the silicon layer; and a liquid crystal layer sandwiched between the first substrate and the second substrate, wherein the first substrate includes a plurality of switching elements formed in the silicon layer, a protection layer formed on the surface of the first substrate so as to cover the switching elements, a plurality of pixel electrodes with gaps therebetween formed in a matrix on the protection layer, and a filler for filling the gaps, and wherein the surface of the filler is formed so as to be at the same level as that of the surfaces of the pixel electrodes.

According to another aspect of the invention, a liquid crystal display apparatus includes: a first substrate having a silicon layer on a surface thereof; a transparent second substrate placed so as to face the silicon layer; and a liquid crystal layer sandwiched between the first substrate and the second substrate, wherein the first substrate includes a plurality of switching elements formed in the silicon layer, a protection layer formed on the surface of the first substrate so as to cover the switching elements, a plurality of pixel electrodes with gaps therebetween formed in a matrix on the protection layer, and a filler for filling the gaps formed on the entire surface of the first substrate so as to cover the pixel electrodes, and wherein the surface of the filler is flat.

In one embodiment of the invention, the first substrate is a single-crystalline silicon substrate.

In another embodiment of the invention, the pixel electrodes are made of metal containing aluminum as a main component.

In still another embodiment of the invention, the filler is either an organic material or an inorganic material.

In still another embodiment of the invention, the organic material is polyimide.

In still another embodiment of the invention, the surfaces of the pixel electrodes are mirror finished.

In still another embodiment of the invention, the unevenness of the surface of the pixel electrodes and the filler is 0.2 µm or less.

A method for producing a liquid crystal display apparatus according to the present invention, the liquid crystal display apparatus includes: a first substrate having a silicon layer on a surface thereof; a transparent second substrate placed so as to face the silicon layer; and a liquid crystal layer sandwiched between the first substrate and the second substrate, wherein the first substrate includes a plurality of switching elements formed in the silicon layer, a protection layer formed on the surface of the first substrate so as to cover the switching elements, a plurality of pixel electrodes with gaps therebetween formed in a matrix on the protection layer, and a filler for filling the gaps, and wherein the surface of the filler is formed so as to be at the same level as that of the surfaces of the pixel electrodes, the method comprising the steps of: forming a conductive film on the protection film; forming the gaps on the conductive film so as to form the plurality of pixel electrodes in a matrix; coating the entire surface of the first substrate with the filler so as to fill the gaps and cover the pixel electrodes; and polishing the filler so that the surfaces of the pixel electrodes are at the same level as that of the surface of the filler.

According to another aspect of the invention, a method for producing a liquid crystal display apparatus, the liquid crystal display apparatus includes: a first substrate having a silicon layer on a surface thereof; a transparent second substrate placed so as to face the silicon layer; and a liquid crystal layer sandwiched between the first substrate and the second substrate, wherein the first substrate includes a plurality of switching elements formed in the silicon layer, a protection layer formed on the surface of the first substrate so as to cover the switching elements, a plurality of pixel electrodes with gaps therebetween formed in a matrix on the protection layer, and a filler for filling the gaps formed on the entire surface of the first substrate so as to cover the pixel electrodes, and wherein the surface of the filler is flat, the method comprising the steps of:

forming a conductive film on the protection film; polishing the conductive film so as to mirror finish the surface of the conductive film, forming the gaps on the conductive film so as to form the plurality of pixel electrodes in a matrix; coating the entire surface of the first substrate with the filler so as to fill the gaps and cover the pixel electrodes; and performing a planarization process and an alignment process on the filler at the same time.

Thus, the liquid crystal display apparatus according to the present invention includes a plurality of pixel electrodes formed in a matrix on a display region of a surface of a substrate, and gaps for dividing each pixel electrode are filled with a filler. The surface of the filler is flush with the surfaces of the pixel electrodes, and the surfaces of the pixel electrodes are mirror finished.

The method for producing a liquid crystal display apparatus according to the present invention includes the steps of forming gaps on the conductive film so as to form pixel electrodes in a matrix, and polishing the surface of a filler filling the gaps between the pixel electrodes and the surfaces of the pixel electrodes simultaneously. Therefore, the surfaces of the pixel electrodes are mirror finished, and simultaneously the surface of the filler is made flush with the surfaces of the pixel electrodes.

Thus, the invention described herein makes possible advantages of (1) providing a liquid crystal display apparatus excellent in uniformity of alignment of liquid crystal having substrates especially excellent in reflecting efficiency, and (2) providing a method for producing such a liquid crystal display apparatus.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

EXAMPLE 1

Figure 1:
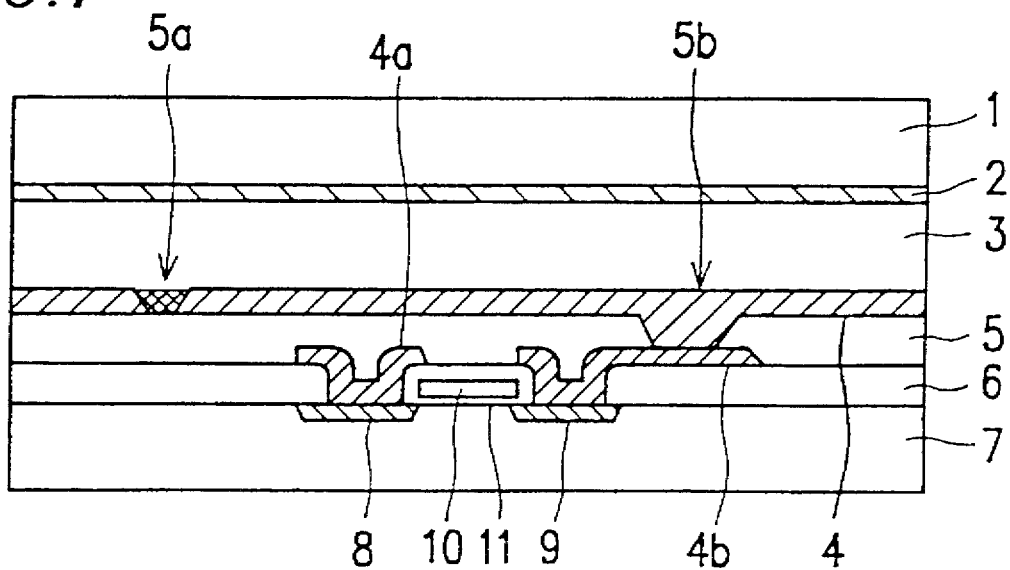
FIG. 1 is a sectional view showing an example of a liquid crystal display apparatus according to the present invention.

FIG. 1 shows a sectional view of a unit pixel region of a liquid crystal display apparatus according to the present invention. The liquid crystal display apparatus of this example has a switching circuit including silicon gate MOS transistors formed on a substrate of the driving side thereof. While FIG. 1 illustrates one switching transistor, a plurality of switching transistors are formed on the substrate.

As shown in FIG. 1, a field silicon oxide film 6 is formed on an entire surface of a base substrate 7 made of single-crystalline silicon. The field silicon oxide film 6 has opening areas for defining active regions of the transistors. A source region 8 and a drain region 9 of each transistor are formed in the corresponding active region of the base substrate 7. Each MOS transistor has a gate insulating film 11 and a gate electrode 10. In this example, the gate electrode 10 is made of polysilicon, and the gate insulating film 11 is made of a silicon dioxide film.

The source region 8 and the drain region 9 are contacted with aluminum electrodes 4a and 4b formed on the field silicon oxide film 6, respectively. The aluminum electrode 4a forms a data bus line for carrying a data signal.

The switching transistors are covered with a protective film 5 formed on the entire surface of the base substrate 7. The protective film 5 has a through hole 5b in each unit pixel region that reaches the aluminum electrode 4b. On the surface of the protection film 5, a plurality of pixel electrodes (also used as reflectors) 4 divided by a gap 5a are formed in a matrix so as to cover substantially the entire surface of the base substrate 7. The pixel electrode 4 is connected with the aluminum electrode 4b via the through hole 5b. In this example, pixel electrode 4 is made of aluminum. Aluminum is a suitable material for the pixel electrode 4, since it has a high optical reflectance. An alignment film (not shown in FIG. 1) is formed on the pixel electrodes 4.

On the entire counter surface of a glass substrate (counter substrate) 1 placed so as to face the base substrate 7, a transparent counter electrode 2 is formed. An alignment film (not shown) is formed so as to cover the counter electrode 2.

A TN (Twisted Nematic) type liquid crystal layer 3 is contained between the glass substrate 1 and the base substrate 7. The transparent glass substrate is used as the side from which light is incident.

In the fabrication process for the liquid crystal display apparatus, a heat treatment is required to lower the contact resistance between the pixel electrodes 4 and the lower aluminum electrode 4b. The heat treatment produces unevenness on the surface of the pixel electrodes 4, which lowers the reflectance. In order to solve this problem, in this example, after each heat treatment succeeding the formations of the protective film 5 and the pixel electrodes 4, the surfaces of the protective film 5 and the pixel electrodes 4 are polished.

The fabrication method of this example is described below. Since the steps of forming the transistors on the single-crystalline silicon substrate is the same as that of the conventional method, that particular description is omitted. Hereinafter, the steps of planarizing the surface of the base substrate 7 and mirror finishing the surfaces of the pixel electrodes 4 are described with reference to FIGS. 2A to 2G.

Figure 2A:
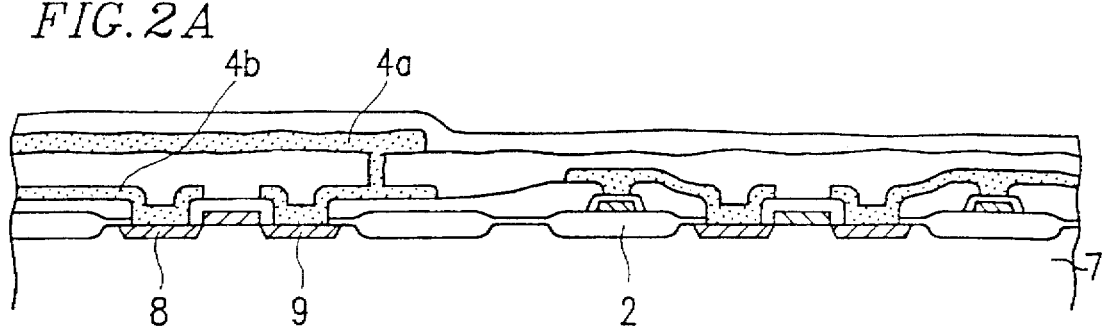
FIGS. 2A to 2G are sectional views showing a first example of a method for producing a liquid crystal display apparatus according to the present invention.

FIG. 2A shows a sectional view illustrating the state in which the IC circuit is formed on the surface of the base substrate 7. The unevenness of about 2 μm is present on the surface of the base substrate 7 with the IC circuit formed thereon. The unevenness is planarized according to the following steps.

Figure 2B:
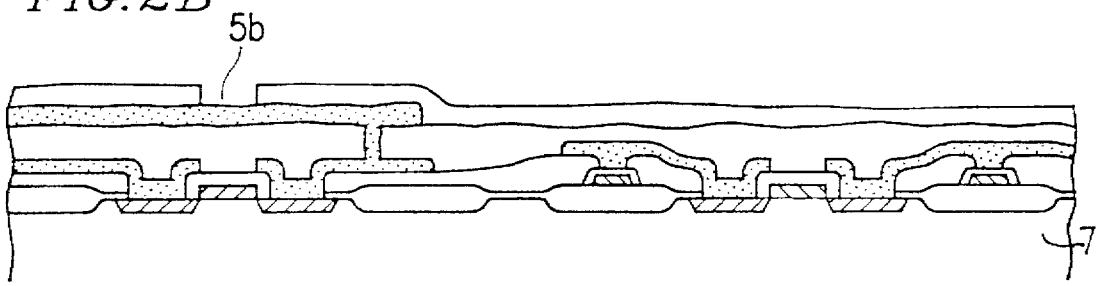

Initially, the through hole 5b for connecting each of the pixel electrodes 4 formed on the surface of the base substrate 7 with the electrode of the IC circuit is formed at a predetermined position. The through hole 5b is about 5 μm² in size, and formed by dry etching. The state resulting from the above process is shown in FIG. 2B.

Figure 2C:
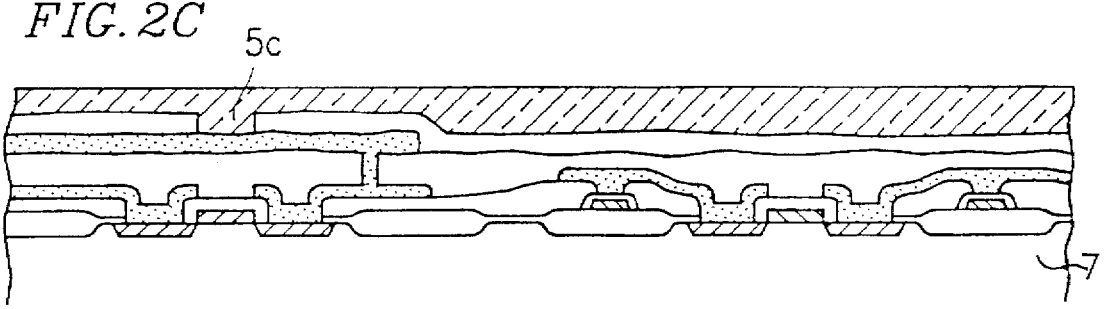

Next, photosensitive polyimide is applied to the entire surface of the base substrate 7 as a planarization film 5c so as to have a thickness of 3 μm. This state is shown in FIG. 2C.

After the exposure and the development, the through hole 5b of 5 μm² is formed again for electrically connecting the drain electrode 9 of the IC circuit with the pixel electrode 4. Then, the annealing at a temperature of 350° C. is performed for about an hour. As a result, the unevenness of the region except for the through hole 5b becomes 0.5 μm or less. At the same time, a marker (not shown) for mask alignment to be performed in the next step is formed.

Figure 2D:
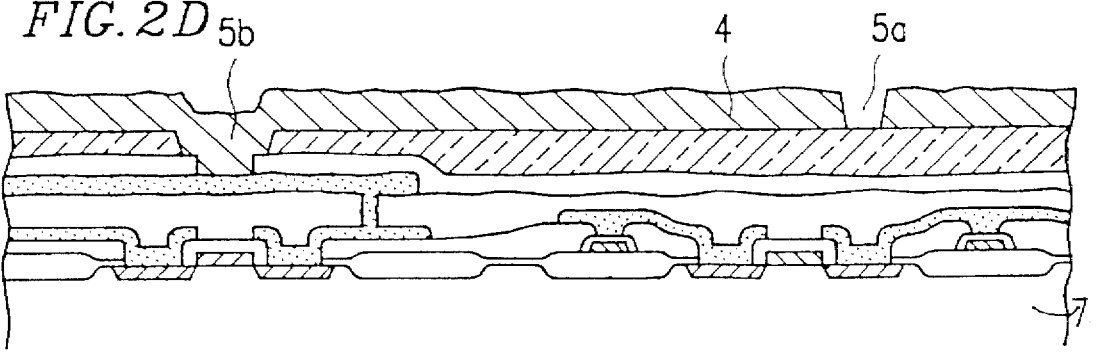

Then, a film made of aluminum (thickness: 2 μm) that is to become the pixel electrodes 4 is deposited, and the gap 5a between the pixel electrodes 4 is formed by etching. This state is shown in FIG. 2D. The mask alignment for the patterning of the gap 5a is performed by using the marker formed when the through hole 5b of the planarization film 5c is formed. The marker may be previously masked before the aluminum-deposition so as to prevent the marker from being covered with deposited aluminum. Alternatively, the portion of aluminum deposited over the marker may be removed by etching. Otherwise, after the formation of the planarization film 5c, the portion of the planarization film 5c formed around the marker may be removed so that the location and shape of the maker can be detected even after the aluminum-deposition. At this stage, since the planarization film 5c is not formed on the through hole 5b, the unevenness of approximately 1 μm is present at the position of the through hole 5b.

Figure 2E:
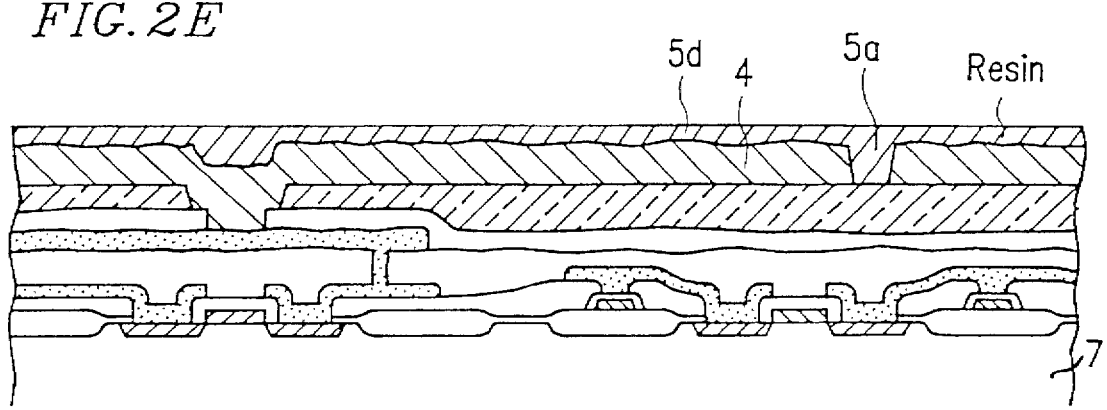

Next, the aluminum film is coated with a polyimide resin (Tisso Co., Ltd., PSI-G-4630 and the like) as a filler 5d for filling the gap 5a between the pixel electrodes 4 by use of a spinner so as to have a thickness of 3 μm. Then, the polyimide resin film is heated at a temperature of 300° C. The state is shown in FIG. 2E.

Figure 2F:
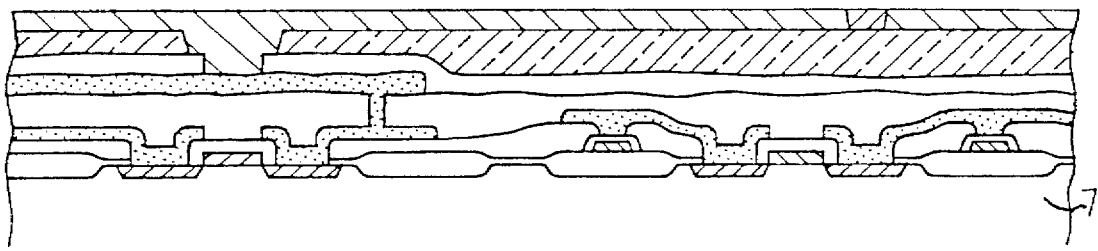

Thereafter, the entire surface of the base substrate 7 is polished and planarized by a device for polishing an LSI wafer and the like. Since the filler 5d filling the gap 5a between the pixel electrodes 4 and the surfaces of the pixel electrodes 4 are mirror finished at the same time, the entire surface of the base substrate 7 is uniformly planarized. The unevenness of the surface of the filler 5d and the surfaces of the pixel electrodes 4 is 0.2 μm or less. The state is shown in FIG. 2F.

Corning Glass 7059 is used for the glass substrate 1 as the counter substrate. As the transparent counter electrode 2, a transparent conductive film such as an ITO (indium-tin-oxide) film is deposited on the entire surface of the glass substrate 1 so as to have a thickness of about 200 μm, and patterned into a desired shape by photolithography. To pattern the transparent conductive film, a masked deposition using a mask at the time of the aluminum-deposition and a lift-off step can be employed.

Alignment films are formed on the entire surface of the glass substrate 1 and the base substrate 7 (silicon substrate). The alignment films are formed of Optomer AL-1051 of Japan Synthesis Rubber Co., Ltd. so as to have a thickness of about 120 nm by flexography. After the formation of the alignment films, aligning process is performed by a rubbing method so that the liquid crystal molecules are twisted by 45°.

After a sealing resin is applied to at least one of the substrates 1 and 7 by screen printing, the substrates 1 and 7 are attached together so that the gap between the substrates 1 and 7 is 5 μm. There are several types of sealing resins, such as a thermosetting type resin, a UV light-curing type resin, and a double-liquid mixed epoxy resin.

Figure 2G:
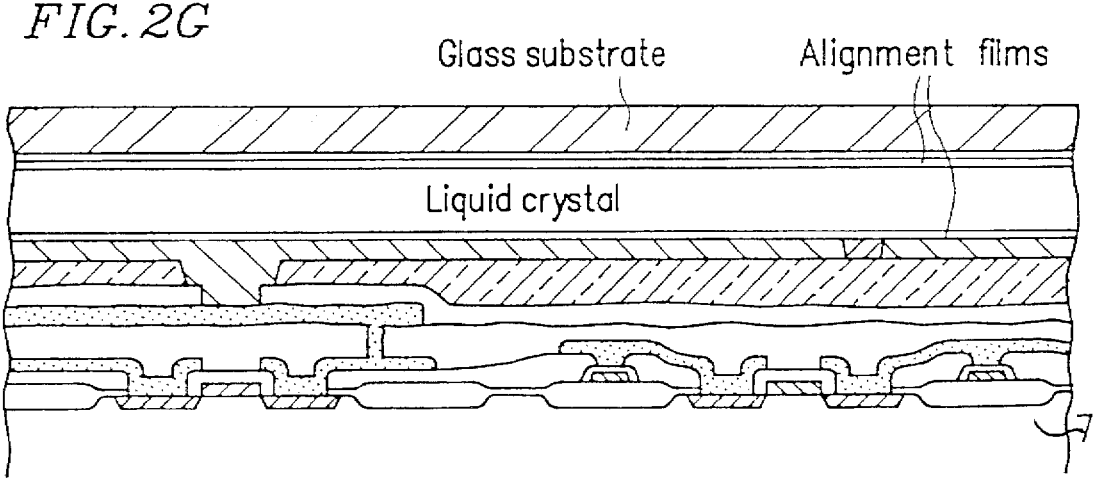

The panel produced as described above is filled with Merck ZLI-1565 to form the liquid crystal layer 3 by a vacuum injection method, and the injection opening is sealed with the UV light-curing resin. The state is shown in FIG. 2G.

Photosensitive polyimide is used as the planarization film 5c in this example. However, polyimide having no photosensitivity, acrylic resin or the like can also be used as far as they are capable of planarizing the surfaces of the substrates.

Polyimide resin is used as the filler 5d for filling the gap 5a between the pixel electrodes 4 in this example. However, other materials, for example, acrylic resin can be used as far as the materials are excellent in flatness of the surface and capable of filling the gap 5a and being polished together with the pixel electrodes 4.

Aluminum is used as the pixel electrodes 4 in this example. However, other materials suitable in reflectance and capable of being polished can also be used.

The general TN type liquid crystal is used as the liquid crystal material 3 in this example. However, other liquid crystal materials such as ferroelectric liquid crystal, polymer dispersion type liquid crystal, guest-host type liquid crystal, and ECB type liquid crystal can also be used.

As described above, according to the liquid crystal display apparatus and the method for producing the same of this example, a reflection-type liquid crystal display apparatus having a substrate in which the pixel electrodes 4 have mirror finished reflection surfaces and have an especially good reflecting efficiency as compared with that of the conventional one can be obtained. Moreover, since the surfaces of the pixel electrodes 4 are almost flush with the surface of the filler 5d, the uniformity of the alignment of the liquid crystal is better than that of the conventional devices.

EXAMPLE 2

Referring now to FIGS. 3A to 3D, another example of a liquid crystal display apparatus according to the present invention will be described.

Figure 3A:
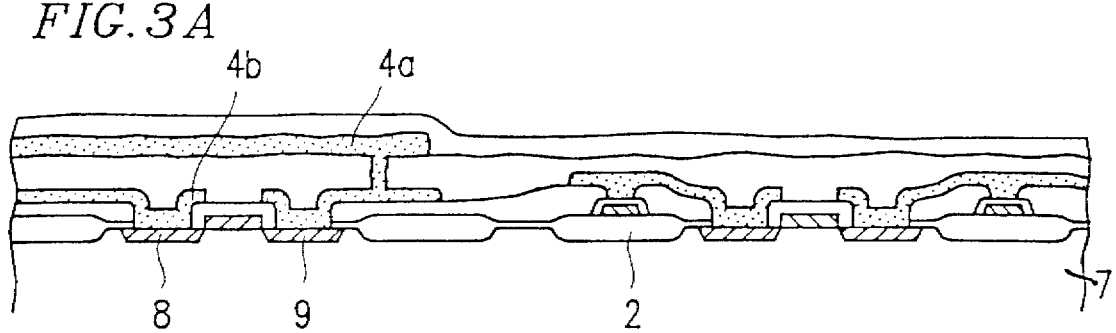
FIGS. 3A to 3D are sectional views showing a second example of a method for producing a liquid crystal display apparatus according to the present invention.

FIG. 3A shows a sectional view illustrating a state in which the transistors are formed on the surface of the base substrate 7. The unevenness of about 2 μm is present on the surface of the base substrate 7 with the transistors formed thereon. The unevenness is planarized according to the following steps.

Figure 3B:
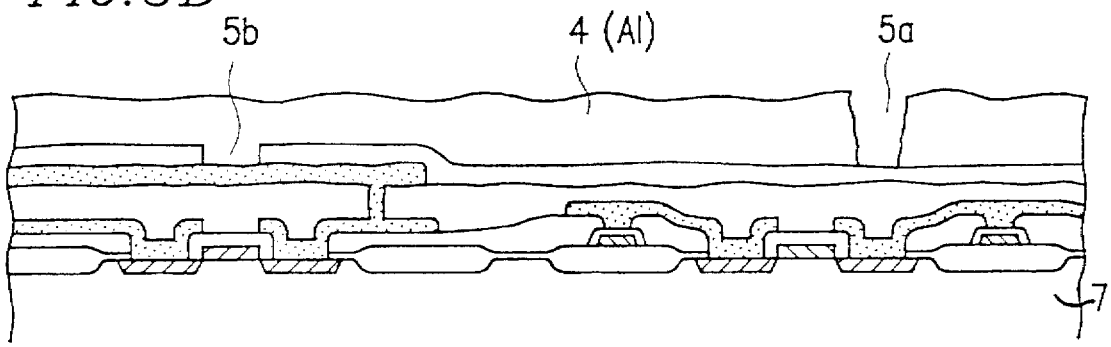

As shown in FIG. 3B, the through hole 5b for connecting each of the pixel electrodes 4 formed on the surface of the base substrate 7 with the electrode of the transistors is formed at a predetermined position. The through hole 5b is about 5 $\mu m^2$ in size, and formed by dry etching.

Next, aluminum as the material of the pixel electrodes 4 is deposited by aluminum-deposition so as to have a thickness of 4 μm. Then, a gap 5a between the pixel electrodes 4 is formed by etching.

Figure 3C:
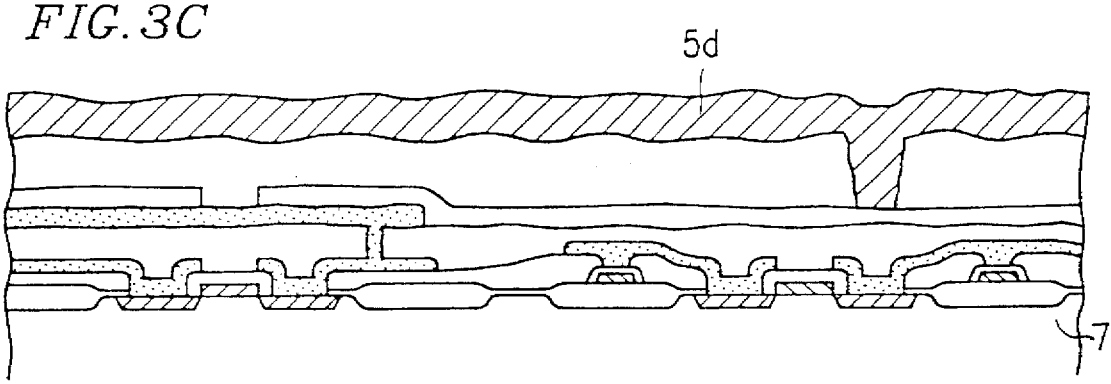

Next, the aluminum film is coated with a polyimide resin (Tisso Co., Ltd., PSI-G-4630 and the like) as a filler 5d for filling the gap 5a between the pixel electrodes 4 by use of a spinner so as to have a thickness of 5 μm. Then, the polyimide resin film is heated at a temperature of 300° C. This state is shown in FIG. 3C.

Figure 3D:
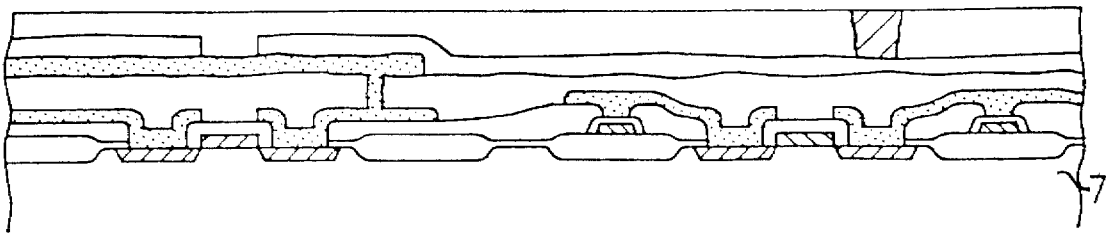

Thereafter, the surface of the filler 5d covering the entire surface of the base substrate 7 is polished by a device for polishing an LSI wafer and the like. The polishing is continued for a while after the removal of the filler 5d on the pixel electrodes 4 so as to expose the surfaces of the pixel electrodes 4. By this process, the surfaces of the pixel electrodes 4 are made flush with the surface of the filler 5d filling the gap 5a and at the same time the surfaces of the pixel electrodes 4 are mirror finished. Thus, the entire surface of the base substrate 7 is uniformly planarized. This state is shown in FIG. 3D. The unevenness of the surface of the filler 5d filling the gap 5a and the surfaces of the pixel electrodes 4 is 0.2 μm or less.

The steps of attaching the glass substrate 1 and the base substrate 7 together and sealing the liquid crystal material so as to form the liquid crystal layer 3 after the formation of the layers on the glass substrate 1 are the same as those of Example 1. Therefore, further description is omitted.

As described above, according to the method for producing the liquid crystal display apparatus of Example 2, a reflection-type liquid crystal display apparatus having a substrate in which the pixel electrodes 4 have mirror finished reflection surfaces and have an especially good reflecting efficiency compared with that of conventional ones can be obtained. Moreover, since the gap 5a between the pixel electrodes 4 is filled with the filler 5d and the surfaces of the pixel electrodes 4 are flush with the surface of the filler 5d filling the gap 5a, the uniformity of the alignment of the liquid crystal is far better than that of the conventional ones.

EXAMPLE 3

Figure 4A:
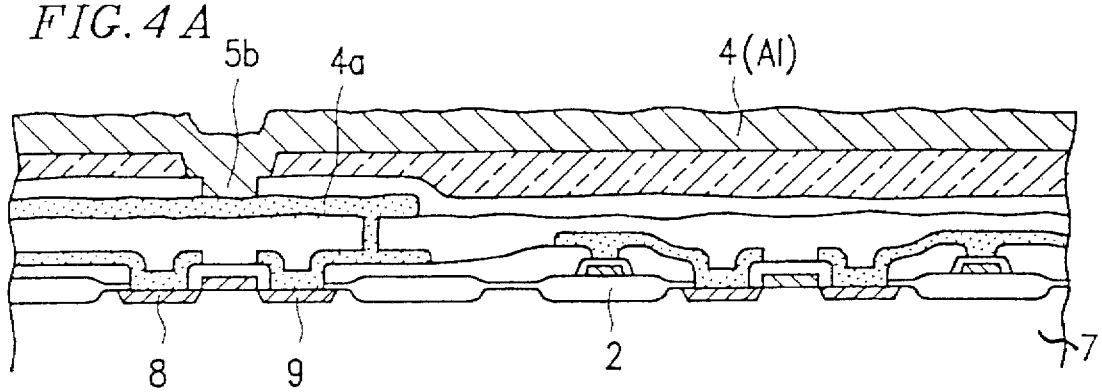
FIGS. 4A to 4C are sectional views showing a third example of a method for producing a liquid crystal display apparatus according to the present invention.
Figure 4B:
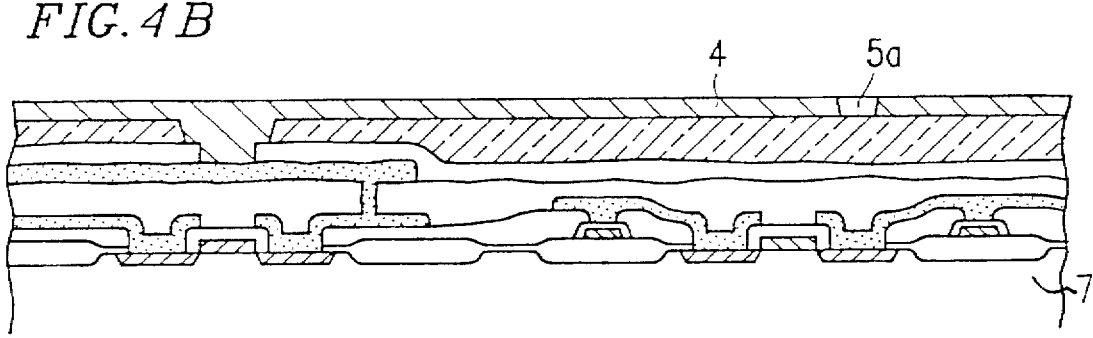
Figure 4C:
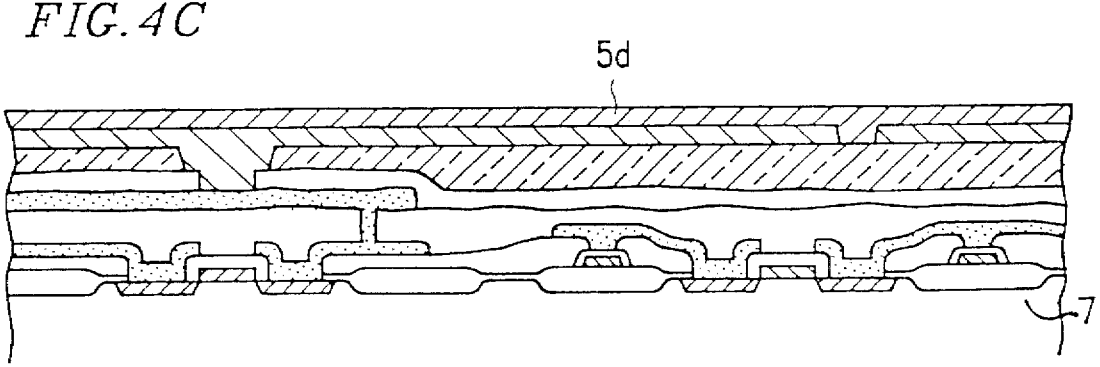
Figure 5:
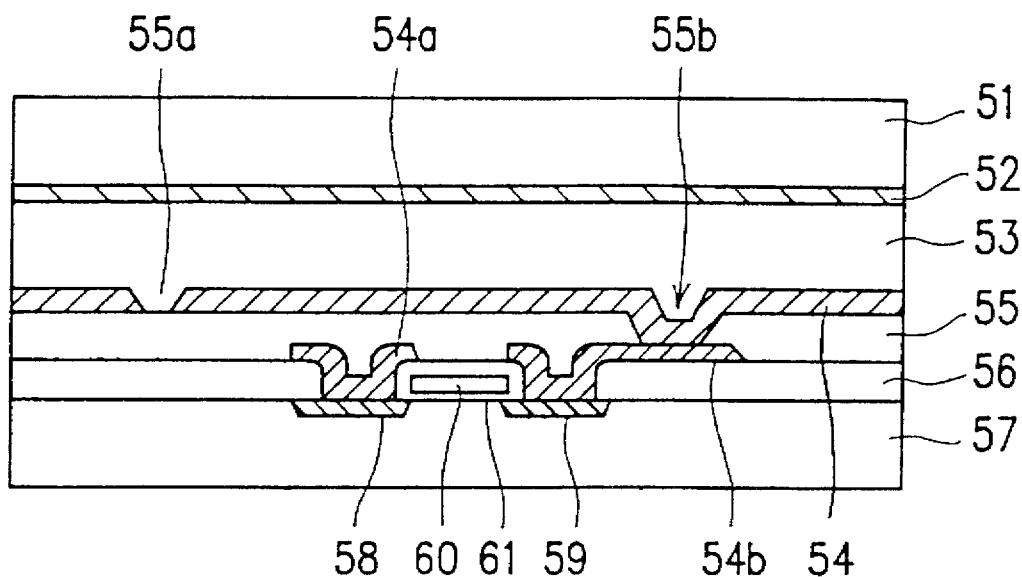
FIG. 5 is a sectional view showing a first conventional example.
Figure 6:
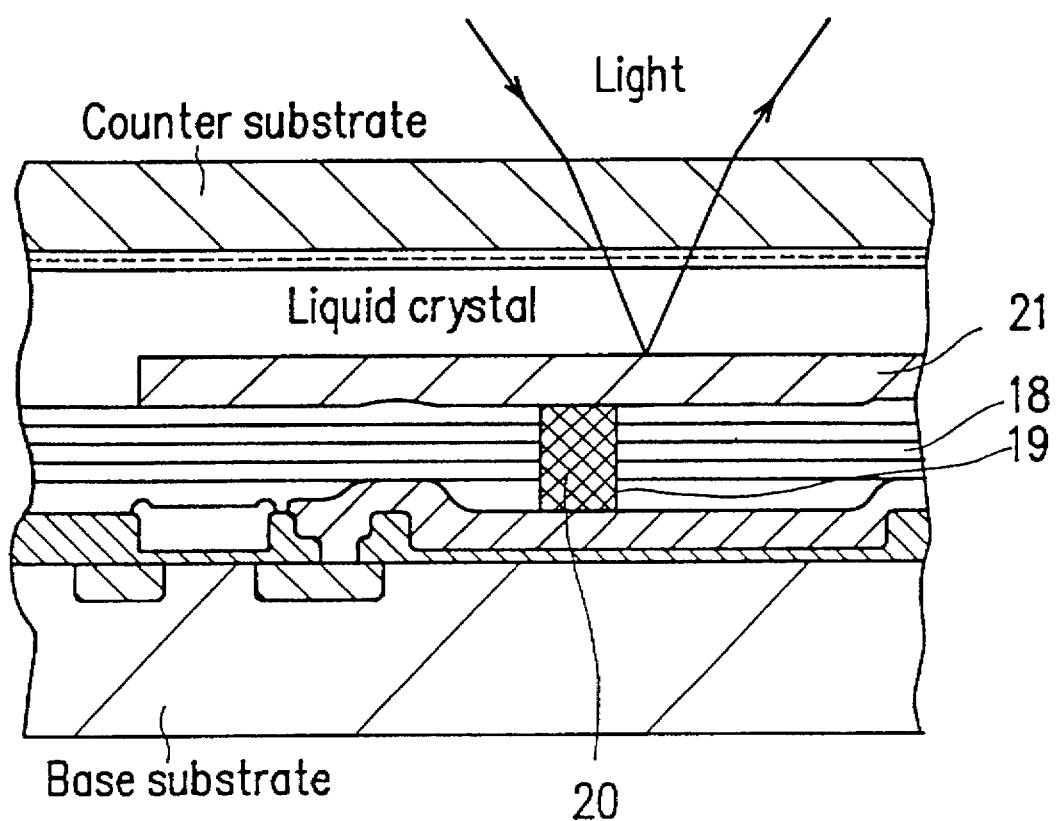
FIG. 6 is a sectional view showing a second conventional example.
Figure 7:
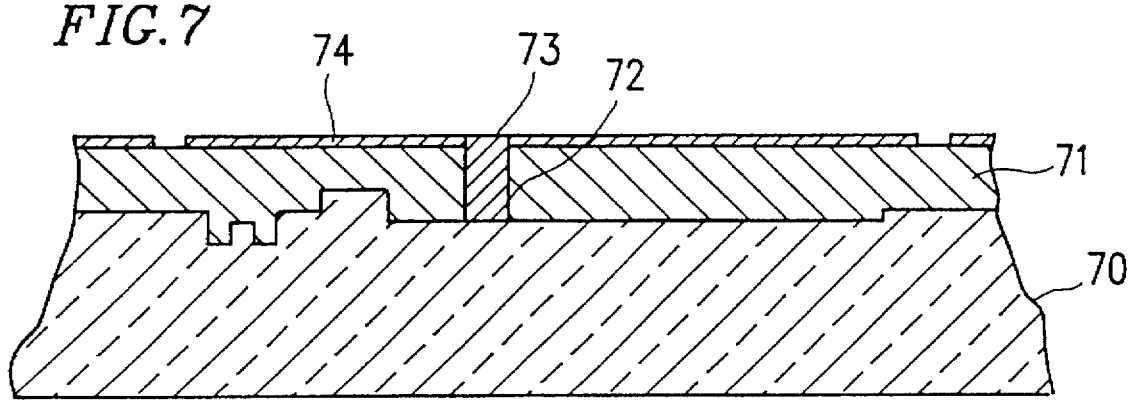
FIG. 7 is a sectional view showing a third conventional example.
Figure 8:
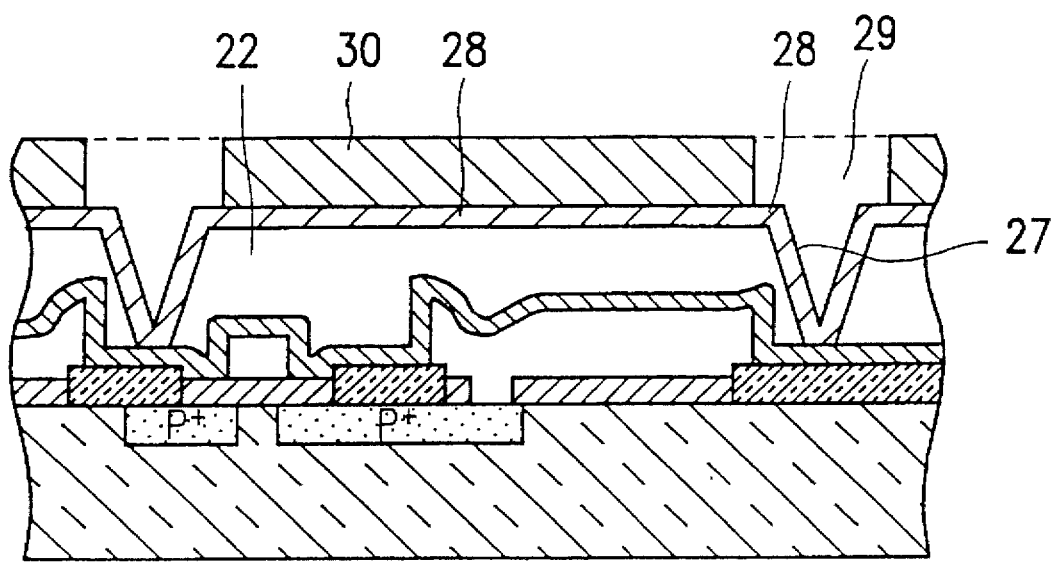
FIG. 8 is a sectional view showing a fourth conventional example.

Referring now to FIGS. 4A to 4C, still another example of a liquid crystal display apparatus according to the present invention will be described.

In this example, the steps until the aluminum for the pixel electrodes 4 is deposited are the same as those of Example 1. Therefore, the steps after the deposition of aluminum are described with reference to FIGS. 4A to 4C.

In this example, when the deposition of aluminum is performed, a marker (not shown) for mask alignment is previously masked so that aluminum will not be deposited on and around the marker. This prevents the marker from being covered with aluminum. In this example, two markers are formed near the silicon wafer. However, the position where each marker is formed and the number of markers can be changed according to requirements.

Thereafter, the surface of the aluminum film is polished over the entire surface of the base substrate 7 by a device for polishing an LSI wafer and the like, so as to mirror finish (planarize) the aluminum film. The state is shown in FIG. 4A.

Then, a gap 5a is formed between the pixel electrodes 4 by etching, as illustrated in FIG. 4B. In this example, the marker portions are masked at the aluminum-deposition of aluminum. However, aluminum may be formed on the marker portions without using a mask and removed by etching after the aluminum-deposition or after the polishing of the aluminum film.

Then, the aluminum film is coated with a polyimide resin (Tisso Co., Ltd. PSI-G-4630 and the like) as a filler 5d for filling the gap 5a between the pixel electrodes 4 by use of a spinner so as to have a thickness of 1 μm. Then, the polyimide resin film is annealed at a temperature of 300° C. The state is shown in FIG. 4C.

After the application and the heat treatment of the filler 5d, the alignment process is performed by rubbing the surface of the filler 5d. The unevenness of the surface of the base substrate 7 covered with the filler (polyimide) 5d is also 0.2 μm or less. The state is shown in FIG. 4C. Since the polyimide film used as the filler 5d can be used as the alignment film, the planarization and the alignment process of the surface of the filler 5d can be performed in the same step. Thus, the steps can be simplified.

The steps of attaching the glass substrate 1 and the base substrate 7 together and sealing the liquid crystal material to form the liquid crystal layer 3 after the formation of the layers on the glass substrate 1 are the same as those of Example 1. Therefore, the description is omitted.

As described above, according to the method for producing the liquid crystal display apparatus of this example, a reflection-type liquid crystal display apparatus having a substrate in which the pixel electrodes 4 have mirror finished reflection surfaces and have an especially excellent reflecting efficiency compared with that of the conventional ones can be obtained. Moreover, the pixel electrodes 4 having the mirror finished surfaces are completely covered with the filler 5d having a flat surface on which the alignment process is performed. As a result, the uniformity of the alignment of the liquid crystal molecular is far better than that of the conventional ones. In addition, as the planarization of the filler 5d and the alignment process are performed at the same time, the steps can be simplified as described above.

As described above, according to the present invention, a liquid crystal display apparatus having a substrate in which pixel electrodes have mirror finished reflection surfaces and are far better in reflecting efficiency than a conventional one can be obtained. Moreover, since the gap between the pixel electrodes is filled with a filler and the surfaces of the pixel electrodes are flush with the surface of the filler, the uniformity of the alignment of the liquid crystal molecular is far better than that of the conventional one. Therefore, the present invention can contribute to the realization of a liquid crystal display apparatus applicable to HDTV.

Various other modification will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus including:
   a first substrate having a silicon layer on the surface thereof;
   a transparent second substrate placed so as to face the silicon layer; and
   a liquid crystal layer sandwiched between the first substrate and the second substrate,
   wherein the first substrate includes a plurality of switching elements formed in the silicon layer, a protective layer formed on the surface of the first substrate so as to cover the switching elements, a plurality of reflective pixel electrodes with gaps therebetween formed in a matrix on the protective layer, and a filler for filling the gaps,
   wherein a surface of the filler and surfaces of the reflective pixel electrodes are polished to form mirror finished surfaces, and the surface of the filler is formed so as to be at the same level as that of the surfaces of the reflective pixel electrodes, and wherein the filler is an inorganic material.

2. A liquid crystal display apparatus according to claim 1, wherein the first substrate is a single-crystalline silicon substrate.

3. A liquid crystal display apparatus according to claim 1, wherein the reflective pixel electrodes are made of metal containing aluminum as a main component.

4. A liquid crystal display apparatus according to claim 1, wherein an unevenness of the surfaces of the reflective pixel electrodes and the surface of the filler is 0.2 μm or less.

5. A liquid crystal display apparatus including:
   a first substrate having a silicon layer on a surface thereof;
   a transparent second substrate placed so as to face the silicon layer; and
   a liquid crystal layer sandwiched between the first substrate and the second substrate,
   wherein the first substrate includes a plurality of switching elements formed in the silicon layer, a protective layer formed on the surface of the first substrate so as to cover the switching elements, a plurality of reflective pixel electrodes with gaps therebetween formed in a matrix on the protective layer, and a filler for filling the gaps formed on an entire surface of the first substrate so as to cover the reflective pixel electrodes, and
   wherein a surface of the filler is flat, and surfaces of the reflective pixel electrodes are polished to form mirror finished surfaces, and wherein the filler is an inorganic material.

6. A liquid crystal display apparatus according to claim 5, wherein the first substrate is a single-crystalline silicon substrate.

7. A liquid crystal display apparatus according to claim 5, wherein the reflective pixel electrodes are made of metal containing aluminum as a main component.

* * * * *